United States Patent [19]

Dobson, Jr. et al.

[11] Patent Number: 5,783,526
[45] Date of Patent: Jul. 21, 1998

[54] PROCESS TO ENHANCE REMOVAL OF ADHERING SOLIDS FROM THE SURFACE OF WELLBORES AND SAND CONTROL DEVICES THEREIN

[75] Inventors: James W. Dobson, Jr., Houston; James P. Cashion, Missouri City; Robert S. Lauer, Richmond, all of Tex.

[73] Assignee: Texas United Chemical Company, LLC., Houston, Tex.

[21] Appl. No.: 810,822

[22] Filed: Mar. 6, 1997

[51] Int. Cl.$^6$ .................................................. C09K 7/02
[52] U.S. Cl. .................. 507/261; 507/923; 507/933; 507/934; 166/311
[58] Field of Search .................... 507/261, 923, 507/933, 934; 166/311

[56] References Cited

U.S. PATENT DOCUMENTS

| | | | |
|---|---|---|---|
| 4,426,296 | 1/1984 | Crowe | 507/261 |
| 4,604,233 | 8/1986 | Rootsaert et al. | 507/261 |
| 4,676,916 | 6/1987 | Crema | 507/261 |
| 4,738,789 | 4/1988 | Jones | 507/261 |
| 4,882,075 | 11/1989 | Jones | 507/261 |
| 4,919,827 | 4/1990 | Harms | 507/261 |
| 5,008,026 | 4/1991 | Gardner et al. | 507/261 |
| 5,310,002 | 5/1994 | Blauch et al. | 507/261 |
| 5,441,929 | 8/1995 | Walker | 507/261 |
| 5,543,388 | 8/1996 | Williams et al. | 507/933 |
| 5,622,921 | 4/1997 | Dyer | 507/261 |

*Primary Examiner*—Philip Tucker
*Attorney, Agent, or Firm*—Roy F. House

[57] ABSTRACT

The invention provides: (1) a process to enhance the removal of solids such as clays, clay-like solids, and shale solids-drill solids-from the surface of a borehole, the solids being deposited from well drilling, completion, or workover fluids during well servicing operations; and (2) a process to enhance the removal of such solids from screens or other sand control devices present in a borehole. The process comprises contacting the solids with an acidic soak solution containing a polyglycol or mono ether derivative thereof and thereafter contacting the surface of the borehole with a wash solution to remove the solids from the borehole.

13 Claims, No Drawings

PROCESS TO ENHANCE REMOVAL OF ADHERING SOLIDS FROM THE SURFACE OF WELLBORES AND SAND CONTROL DEVICES THEREIN

The use of fluids for conducting various operations in the boreholes of subterranean oil and gas wells which contact a producing formation are well known. Thus drill-in fluids are utilized when initially drilling into producing formations. Completion fluids are utilized when conducting various completion operations in the producing formations. Workover fluids are utilized when conducting workover operations of previously completed wells.

One of the most important functions of these fluids is to seal off the face of the wellbore so that the fluid is not lost to the formation. Ideally this is accomplished by depositing a filter cake of the solids in the fluid over the surface of the borehole without any loss of solids to the formation. In other words, the solids in the fluid bridge over the formation pores rather than permanently plugging the pores.

Many clay-free fluids have been proposed for contacting the producing zone of oil and gas wells. See for example the following U.S. Pat. Nos.: Jackson et al. 3,785,438; Alexander 3,872,018; Fischer et al. 3,882,029; Walker 3,956,141; Smithey 3,986,964; Jackson et al. 4,003,838; Mondshine 4,175,042; Mondshine 4,186,803; Mondshine 4,369,843; Mondshine 4,620,596; and Dobson, Jr. et al. 4,822,500.

These fluids generally contain polymeric viscosifiers such as certain polysaccharides or polysaccharide derivatives, polymeric fluid loss control additives such as lignosulfonates, polysaccharides or polysaccharide derivatives, and bridging solids.

Clay-containing fluids such as fluids containing a bentonitic clay and mixed metal hydroxides have been disclosed. See for example the following U.S. Pat. Nos.: Burba et al. 4,790,954; Burba et al. 5,094,778; and Plank 5,504,061. These fluids may also contain polymeric fluid loss control additives.

After the wellbore fluid has completed its desired function, it is desirable to remove the filter cake before placing the well on production. When the bridging agent in the wellbore fluid is acid soluble, this is generally accomplished by displacing the wellbore fluid with a strongly acidic solution and allowing the acidic solution to contact the filter cake for a period of time which is sufficient to solubilize the bridging particles. These strongly acidic solutions require specialized equipment for their safe handling since they are extremely corrosive to equipment and on personal contact. When the bridging agent is water soluble, the wellbore fluid is displaced with a shale-inhibitive aqueous fluid which is undersaturated with respect to the water soluble bridging particles. This undersaturated fluid requires a long contact time to accomplish the solubilization of the water soluble bridging particles due to the encapsulating effect of the polysaccharide polymer or polymers present in the filter cake.

Processes are known in the art for removing polymeric materials from a porous media such as a subterranean formation. See for example the following U.S. Pat. Nos.: Hanlon et al. 4,609,475; Brost 4,846,981; McGlathery 4,871,022.

A process for enhancing removal of polymer-containing filter cakes from wellbores is disclosed in Mondshine et al. U.S. Pat. No. 5,238,065. The process comprises contacting the filter cake with an acidic solution containing an alkaline earth or zinc peroxide for a period of time sufficient to decompose the polymers therein. In copending patent application of James W. Dobson, Jr. et al., Ser. No. 08/212,814 filed Mar. 15, 1994, there is disclosed the addition of an alkaline earth or zinc peroxide to a well drilling or servicing fluid such that the peroxide is deposited in the filter cake on the sides of the borehole contacted by the fluid. Subsequent contacting of the filter cake with an acidic solution activates the peroxide releasing hydrogen peroxide which degrades the polymers in the filter cake. This opens up the filter cake such that subsequent clean-up solutions will have an improved removal efficiency for the remaining bridging solids.

While the wellbore fluids are preferably clay-free fluids, during use all wellbore fluids will accumulate drill solids which are too fine to be removed mechanically such as with screens, centrifuges, and the like. These drill solids become incorporated in the filter cake along with all other solids in the fluid. The drill solids which contact the surface of the borehole are not easily removed by known soaking/washing procedures including those discussed herein. Thus as the filter cake is degraded, the drill solids in the cake which do not contact the formation will be removed along with the other solids in the degraded filter cake, leaving behind the drill solids in contact with the borehole surface.

Thus there is a need for a process of enhancing the removal of the drill solids from the surface of a borehole penetrating a hydrocarbon-bearing formation.

When completing wells in unconsolidated sand reservoirs, sand exclusion means are placed in the open hole interval to control the entry of sand into the borehole. These include gravel packs, slotted liners, prepacked screens, all-metal screens, and the like which are known in the art. Screen failures due to plugging by fines and shaly sand particularly in silty reservoirs is a common problem.

Of significant concern during horizontal well completions is efficient removal of drill-in fluids and residual filter cake after sand control screen placement. Such residuals can cause plugging that hampers production once the well is placed online.

Thus there is a need for a process of enhancing the removal of plugging particles from completion screens and other sand control means.

It is an object of this invention to provide a process for enhancing the removal of solids from the surface of a borehole penetrating a hydrocarbon-bearing formation.

It is another object of this invention to provide a process for enhancing the removal of clays, clay-like solids and shale solids from the surface of a borehole.

Still another object of this invention is to provide a process for enhancing the removal of solids from screens and other sand control devices placed in a borehole in a hydrocarbon-bearing formation.

These and other objects of the invention will be obvious to one skilled in the art upon reading this specification and claims.

SUMMARY OF THE INVENTION

The present invention provides a process for enhancing the removal of clays, clay-like solids, shale solids, and the like from the surface of a borehole, the solids being deposited along with a filter cake on the borehole surface from well drilling, completion, or workover fluids (hereinafter referred to as well servicing fluids) during wellbore operations. The invention also provides a process for enhancing the removal of solids from sand control devices such as prepacked screens, all metal screens, and the like, placed in the wellbore during completion operations. The processes comprise contacting the solids with an acidic solution of a polyglycol, or a mono ether derivative thereof, for a period of time sufficient to decrease the adherence of the solids such they can be subsequently removed from the surface of the borehole with a wash solution.

The preferred polyglycols useful in this invention have the empirical formula:

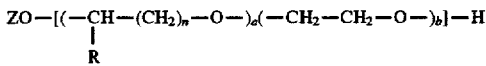

where:

R=H or $CH_3$

Z=H or a haydrocarbyl group containing from 1 to 20 carbon atoms n=1 when R=$CH_3$ n=3 when R=H a=0–70, provided that a>o when b=0 b=0–250, provided that b>o when a=0

When Z=a hydrocarbyl group containing from 1 to about 20 carbon atoms the corresponding mono ether derivatives are obtained.

The process or method can comprise, consist essentially of, or consist of the stated steps with the stated materials.

DETAILED DESCRIPTION OF THE EMBODIMENTS OF THE INVENTION

It is well known in the art that the filter cake which forms a seal on the surface of a borehole in a hydrocarbon-containing formation must be removed in order to obtain maximum hydrocarbon production. Thus it is desired that the permeability of the formation not be decreased as a result of the well servicing operations, or at least the reduction is minimized. As indicated hereinbefore, various methods have been utilized to accomplish the removal of the filter cake. This includes various soak solutions and washes to breakdown and/or solubilize the various materials in the filter cake. However, when the filter cake contains clays, clay-like solids, shale solids, and the like, whether intentionally added to the well servicing fluid or incorporated in the well servicing fluid from drill solids during well servicing operations, the clays, clay-like solids, and shale solids (hereinafter referred to as adhering solids regardless of source) which are in contact with the surface of the formation have proven to be difficult to remove.

It has now been determined that the removal of the adhering solids on the surface of a borehole is enhanced by placing an acidic soak solution in contact with the borehole surface, wherein the acidic soak solution contains a polyglycol or a mono ether derivative thereof, for a period of time sufficient to decrease the adherence of the adhering solids, and thereafter washing the borehole surface with an appropriate wash solution to flush the solids from the borehole.

The filter cake on the surface of a borehole may first be removed by any of the processes known in the art, such as those discussed hereinbefore. Generally the filter cake is contacted with an acidic soak solution for a period of time sufficient to convert the filter cake to a loosely adherent mass on the surface of the borehole, and thereafter contacting the filter cake with a wash solution to remove the filter cake solids from the borehole surface. Preferably, an alkaline earth or zinc peroxide is added to the well servicing fluid, regardless of its composition or formulation, and deposited in the filter cake along with other solids from the well servicing fluid. Placing an acidic soak solution in contact with the filter cake then enhances removal of the filter cake from the surface of the borehole. As indicated hereinbefore, such a process for polymer-containing filter cakes is disclosed in co-pending patent application Ser. No. 08,212,814 filed Mar. 15, 1994, incorporated herein by reference. Thereafter any adhering solids remaining on the surface of the borehole are removed in accordance with the present invention.

Generally, however, it is sufficient to contact the filter cake with an acidic polyglycol solution in accordance with this invention for a period of time sufficient to decompose the filter cake and decrease the adherence of the adhering solids on the surface of the borehole, and thereafter wash the solids from the borehole.

The preferred polyglycols or mono ether derivatives thereof useful in this invention have the empirical formula:

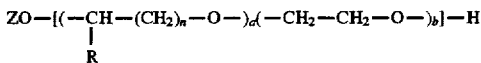

where:

R=H or $CH_3$

Z=H or a hydrocarbyl group containing from 1 to 20 carbon atoms n=1 when R=$CH_3$ n=3 when R=H a=0–70 b=10–250

Most preferably, a=0–10, b=90–200 when a=0, R=H or $CH_3$, and Z=H. Also most preferably, when a ≠0, then Z=H, R=H, n=3, and a=5–10. It is most particularly preferred that a=0, Z=H, and b=90–200.

Representative hydrocarbyl groups include alkyl groups having the formula $C_dH_{2d+1}$ where d is an integer from 1 to 20, and alkyl aryl groups having the empirical formula $C_eH_{2e+1}$—$C_6H_4$ where e is an integer from 1 to 14.

The distribution of the alkylene oxide groups within the polyglycol may be in any order. Preferably, however, the higher alkylene oxide groups represented by (—CH(R)—$(CH_2)_n$—O$)_a$ occur in at most two separate segments of the molecule.

The acidic polyglycol soak solution will contain sufficient acid and polyglycol to enhance the removal of the adhering solids over the desired soak time. In general, the soak time decreases as the acid strength increases. It is preferred that the acidic polyglycol soak solution contain at least about 2.5% by weight hydrochloric acid, most preferably at least about 5% by weight. Other acids may be used such as sulfuric acid, phosphoric acid, nitric acid, hydrofluoric acid, hydrobromic acid, formic acid, acetic acid, sulfamic acid, and the like. The concentration of acid sufficient to enhance the removal of the solids can be determined by testing as disclosed herein. The concentration of the polyglycol or mono ether derivative thereof in the soak solution will be from about 10% by weight to about 100% by weight of the acid free solution.

The acidic polyglycol soak solution may be made by mixing the desired components in any order. Preferably the polyglycol and mono ether derivative thereof will be dispersed or solublized in an aqueous liquid, or water soluble liquid, in the desired concentration and the acid added thereto in the desired concentration. The acidic polyglycol soak solution may contain other desired functional additives such as corrosion inhibitors, de-emulsifiers, foam inhibitors, scale inhibitors, and the like.

The soak solution should have a density which is compatible with the density of the liquid in the borehole which the soak solution displaces in order to minimize mixing of the soak solution with the liquid, and to control the formation pressure. Where higher densities are required, preferably the soak solution contains inorganic water soluble salts dissolved therein in amounts up to saturation to provide the desired density. Typical salts are generally selected from the group consisting of sodium chloride, sodium bromide, potassium chloride, potassium bromide, calcium chloride, calcium bromide, zinc chloride, zinc bromide, sodium formate, potassium formate, cesium formate, calcium formate, calcium nitrate, and mixtures thereof. The salt must be compatible with the acid used to produce the soak solution.

The wash solution is used to displace the acidic polyglycol soak solution and the drill solids removed from the borehole surface from the borehole. It is preferred that the wash solution have no appreciable effect on the permeability of the formation. Normally low density wash solutions contain one or more salts which inhibit the swelling and/or dispersion of particles within the formation. Representative of such salts are potassium salts, such as potassium chloride and potassium acetate, ammonium chloride, quaternary ammonium salts of low molecular weight, and other salts as is known in the art. Preferably a low density wash solution will contain from about 0.05% to about 10% by weight of the salt, most preferably from about 0.1% to about 5%. The preferred salt is potassium chloride. The wash solution must have a density which is compatible with the density of the wash solution in order to minimize mixing of the wash solution with the soak solution and to control the formation pressure. Thus where higher densities are required, the wash solution may contain inorganic water soluble salts dissolved therein in amounts up to saturation to provide the desired density. Typical salts are generally selected from the group consisting of sodium chloride, sodium bromide, potassium chloride, potassium bromide, calcium chloride, calcium bromide, zinc chloride, zinc bromide, sodium formate, potassium formate, cesium formate, calcium formate, calcium nitrate, and mixtures thereof The salt must be compatible with the acid used to produce the soak solution.

The acidic polyglycol soak solution as described can also be used as indicated to enhance the removal of solids from sand control devices placed in the wellbore during completion operations. Thus the acidic polyglycol soak solution is placed in contact with the sand control devices for a period of time sufficient to decrease the adherence of the plugging solids, and thereafter the solids are washed from the devices with an appropriate wash solution or removed by the produced fluid flowing through the device.

The invention will be understood in light of the following specific examples, which are merely illustrative and should not be construed as limiting the invention in any respect, as will be evident to those skilled in the art.

In the examples to follow, the procedure used to prepare the filter cake and the laboratory procedure used to illustrate the process of removing the filter cake and the process of removing the drill solids from the surface of a borehole are as follows:

Filter Cake Deposition
1. Silicone a 44.45 millimeter diameter aloxite disk of 5 darcy permeability to an endcap that fits into a high temperature/high pressure API cell and place it in a cell.
2. Add the desired well servicing fluid, approximately 150 milliliters, in the cell and finish assembling the cell.
3. Place the cell in a heating jacket at the desired temperature and pressure for 16 hours.
4. After 16 hours, remove the cell from the jacket and cool. Disassemble the cell and remove the cake covered disk from the cap.

Filter Cake Removal
5. Silicone the cake covered disk to a pint jar lid and place the lid on a jar containing the filter cake soak solution—10% by weight hydrochloric acid.
6. Static age the jar at 190° F. (87.8° C.) and 250 psi (1723.7 kPa) until the cake breaks and falls from the disk leaving behind any drill solids adhering to the disk.
7. Remove the filter cake soak solution from the jar, add a 3% KCl wash solution, and hot roll at 100° F. (37.8° C.) for 10 minutes.
8. Remove the wash solution from the jar, add another 3% KCl wash solution, and hot roll for an additional 10 minutes at 100° F. (37.8° C.).
9. Remove the wash solution and visually estimate the percent of the disk surface covered by adhering drill solids.

Drill Solids Removal
10. Add the acidic polyglycol soak solution to the jar and static age the jar at 190° F. (87.8° C.) and hot roll the jar at 185° F. (85° C.)–190° F. (87.8° C.) for various time periods. The progress of drill solids removal is visually checked periodically and reported as the estimated percentage of the original insoluble drill solids that have been removed from the disk.

The procedure used to evaluate the effect of removing solids from the surface of the borehole or from a completion sand control device or screen is as follows:

INJECTION/RETURN FLOW PROCEDURE
1. Using standard injection/return flow equipment and a 3% KCl solution, first establish initial injection permeability through the front side of a one (1) darcy aloxite disk. Then turn the disk over, insert a 40/60 prepacked sand wafer, and re-run to determine the initial return permeability. The relative permeability is taken as the number of seconds for 300 milliliters of the KCl solution to pass through the disk under a differential pressure of 30 psi (206.8 kPa).
2. Add the desired well servicing fluid into the cell and assemble. Place the cell in a heating jacket at 175° F. (79.4° C.) and 250 psi (1723.7 kPa) and deposit the filter cake for 16 hours.
3. Cool the cell, decant the fluid from the cell, and add a 10% HCl soak solution. Allow the acid to contact the filter cake at 175° F. (79.4° C.) and 250 psi (1723.7 kPa) for the time set forth in the tables. Cool the cell and decant the acid soak solution.
4. Add a 3% KCl solution to the cell and hot roll at 150° F. (65.5° C.) and 100 psi (689.5 kPa) for 10 minutes. Cool the cell and decant the KCl solution.
5. Repeat step 4.
6. Fill the cell with the acidic polyglycol soak solution and allow the solution to contact the solids remaining on the disk at 175° F. (79.4° C.) and 250 psi (1723.7 kPa) for the time set forth in the tables. Cool the cell and decant the acidic polyglycol soak solution.
7. Repeat step 4.
8. Repeat step 4.
9. Establish the final injection permeability through the front side of the cleaned disk with a 3% KCl solution as in step 1.
10. Repeat step 9 and calculate the average final injection permeability.
11. Turn the disk over, insert a 40/60 prepack sand wafer, and repeat step 9 to establish a final return permeability.
12. Repeat step 11 and calculate the average final return permeability.
13. Calculate the % of the initial injection permeability and the initial return permeability.

EXAMPLE 1

To 350 milliliters of a used drill-in fluid containing a saturated salt brine, biopolymer viscosifier, a starch derivative fluid loss control additive, and a sized salt bridging agent admixed with an unknown quantity of drill solids were added 15 grams of REV DUST shale solids. A filter cake was deposited on an aloxite disk from the fluid at 190° F. (87.8° C.) and 350 psi (2413 kPa). The filter cake was then removed with 10% HCl in saturated sodium chloride by static aging for one hour at 190° F. (87.8° C.). After two 3% KCl washes, the acidic polyglycol soak solution set forth in Table 1 was used to enhance the removal of the drill solids remaining on the disk. The data obtained is set forth in Table 1. Test 6 which does not contain any polyglycol is not an example of the invention and is presented for comparison purposes only.

EXAMPLE 2

Example 1 was repeated using the acidic polyglycol soak solutions set forth in Table 2. The data obtained for the removal of the solids on the ceramic disk are set forth in Table 2.

TABLE 1

Evaluation of Polyethylene Glycol of MW = 8000

| Soak Solution | 1 | 2 | 3 | 4 | 5 | 6 |
|---|---|---|---|---|---|---|
| Volume % HCl (31.5%) | 12.4 | 12.4 | 6.0 | 18.6 | 6.2 | 13.8 |
| Volume % PG Solution | 87.6 | 87.6 | 93.8 | 81.4 | 93.8 | 86.2 |
| % PG in PG Solution | 33.3 | 33.3 | 50.0 | 50.0 | 22.2 | 0 |
| % EG in PG Solution | 0 | 66.7 | 0 | 0 | 0 | 0 |
| % Drill Solids on Disk | 5 | 40 | 25 | 20 | 20 | 10 |
| Static Aged at 87.8° C. | | | | | | |
| Minutes | 90 | 60 | 60 | 60 | 60 | 60 |
| % Solids Removed | 50 | 80 | 20 | 30 | 90 | NC |
| Hot Rolled at 85–87.8° C. | | | | | | |
| Minutes | 120 | 60 | 30 | 30 | 60 | 120 |
| % Solids Removed | Sl | Tr | 30 | Sl | Tr | NC |
| Static Aged at 87.8° C. | | | | | | |
| Minutes | 60 | 60 | 150 | 150 | — | — |
| % Solids Removed | 75 | NC | 70 | 70 | — | — |
| Total Soak Time, min | 270 | 180 | 240 | 240 | 120 | 180 |
| Total % Solids Removed | 75 | 95+ | 70 | 70 | 95+ | 0 |

PG = Polyglycol
EG = Ethylene Glycol
NC = No Change
Sl = Slight increase in the % solids removed
Tr = Only trace of solids remaining on the disk

TABLE 2

Evaluation of Polytetramethylene Glycol

| Soak Solution | 1 | 2 | 3 | 4 |
|---|---|---|---|---|
| Volume % HCl (31.5%) | 12.4 | 12.4 | 12.4 | 12.4 |
| Volume % PG Solution | 87.6 | 87.6 | 87.6 | 87.6 |
| % PG in PG Solution | 33.3 | 100 | 50 | 33.3 |
| Approx. MW of PG | 650 | 650 | 2000 | 2000 |
| % Drill Solids on Disk | 65 | Tr | 50 | Tr |
| Static Aged at 87.8° C. | | | | |
| Minutes | 60 | 60 | 60 | 60 |
| % Solids Removed | 15 | Sl | 70 | Sl |
| Hot Rolled at 85–87.8° C. | | | | |
| Minutes | 60 | 60 | 60 | 60 |
| % Solids Removed | 90 | Sl | Tr | Sl |

TABLE 2-continued

Evaluation of Polytetramethylene Glycol

| Soak Solution | 1 | 2 | 3 | 4 |
|---|---|---|---|---|
| Static Aged at 87.8° C. | | | | |
| Minutes | 120 | 90 | 60 | 90 |
| % Solids Removed | 100 | 100 | NC | 100 |
| Total Soak Time, min | 240 | 210 | 180 | 210 |
| Total % Solids Removed | 100 | 100 | 95+ | 100 |

PG = Polyglycol
EG = Ethylene Glycol
NC = No Change
Sl = Slight increase in the % solids removed
Tr = Only trace of solids remaining on the disk

EXAMPLE 3

To a well drilling and servicing fluid containing 1.25 lbm/bbl (3.57 kg/m$^3$) xanthan gum viscosifier, 3.75 lbm/bbl (10.71 kg/m$^3$) epichlorohydrin crosslinked hydroxypropyl starch fluid loss control additive, and 38 lbm/bbl (108.57 kg/m$^3$) sized calcium carbonate bridging agent were added 30 lbm/bbl (85.71 kg/m$^3$) Rev Dust and 5 lbm/bbl (14.285 kg/m$^3$) Pierre Shale to simulate formation solids. The fluids used in tests 4 and 5 in Table 3 also contained 0.25 lbm/bbl (0.71 kg/m$^3$) magnesium peroxide and 0.1 lbm/bbl (0.286 kg/m$^3$) sodium thiosulfate. The Injection/Return Flow procedure was conducted using these fluids and the acidic polyglycol soak solutions set forth in Table 3. The data obtained are set forth in Table 3. Test 1 which does not contain any polyglycol and Test 2 which does not contain any acid in the soak solution are not examples of the invention and are presented for comparison purposes only.

EXAMPLE 4

To a well drilling and servicing fluid containing 1.25 lb/bbl (3.57 kg/m$^3$) xanthan gum viscosifier, 3.75 lb/bbl (10.71 kg/m$^3$) epichlorohydrin crosslinked hydroxypropyl starch fluid loss control additive, 46 lbm/bbl (131.42 kg/m$^3$) sized sodium chloride bridging agent in a saturated sodium chloride brine were added 30 lbm/bbl (85.71 kg/m$^3$) Rev Dust and 5 lbm/bbl (14.285 kg/m$^3$) Pierre Shale to simulate formation solids. The Injection/Return Flow procedure was conducted using this fluid and the acidic polyglycol soak solutions set forth in Table 4. The data obtained are set forth in Table 4. Test 1 which does not contain any polyglycol in the soak solution is not an example of the invention and is presented for comparison purposes only.

TABLE 3

Evaluation of Polyethylene Glycol of MW = 8000

| Test | 1 | 2 | 3 | 4 | 5 |
|---|---|---|---|---|---|
| Acid Soak Time, hr | 2.5 | 2.5 | 2.5 | 2.5 | 3 |
| Acidic Polyglycol Soak Time, hr | 5 | 5 | 5 | 5 | 7.25 |
| Acidic Polyglycol Soak Solution | | | | | |
| Volume % HCl (31.5%) | 14 | 0 | 14 | 14 | 14 |
| Volume % PG Solution | 86 | 100 | 86 | 86 | 86 |
| % PG in PG Solution | 0 | 33.3 | 33.3 | 33.3 | 33.3 |
| Permeability, Initial, sec | | | | | |
| Injection | 20.5 | 21.5 | 23.5 | 24 | 30.5 |
| Return | 22.5 | 21 | 26 | 24 | 25.5 |

TABLE 3-continued

Evaluation of Polyethylene Glycol of MW = 8000

| Test | 1 | 2 | 3 | 4 | 5 |
|---|---|---|---|---|---|
| Permeability, Final, sec | | | | | |
| Injection | 4278 | NF | 39 | 32 | 31.5 |
| Return | 55.5 | 42.5 | 30.25 | 29 | 26.5 |
| Permeability, % of Initial | | | | | |
| Injection | 0.5 | — | 60 | 75 | 97 |
| Return | 41 | 49 | 86 | 83 | 96 |

PG = Polyglycol
NF = No Flow, Pores Plugged

TABLE 4

Evaluation of Polyethylene Glycol of MW = 8000

| Test | 1 | 2* |
|---|---|---|
| Acid Soak Time, hr | 2 | 4.75 |
| Acidic Polyglycol Soak Time, hr | 5 | 5 |
| Acidic Polyglycol Soak Solution | | |
| Volume % of HCl (31.5%) | 14 | 14 |
| Volume % PG Solution | 86 | 86 |
| % PG in PG Solution | 0 | 33.3 |
| Permeability, Initial, sec | | |
| Injection | 24.5 | 25.25 |
| Return | 24 | 25.25 |
| Permeability, Final, sec | | |
| Injection | 39.5 | 28.75 |
| Return | 34 | 30.25 |
| Permeability, % of Initial | | |
| Injection | 62 | 88 |
| Return | 71 | 84 |

*Average of two tests
PG = Polyglycol

EXAMPLE 5

A 13.5 lbm/gal (1620 kg/m$^3$) well drilling and servicing fluid was prepared containing 283.5 milliliters of a 14.2 lbm/gal (1704 kg/M$^3$) calcium bromide brine, 7 grams of an acid degraded starch derivative fluid loss additive, 1 gram of a xanthan gum biopolymer viscosifier, 0.1 milliliter of diethyleneglycol, 0.1 milliliter of a silicone defoamer, 5.7 grams of calcium bromide powder, 7 milliliters of a fumed silica, 1 gram of magnesium oxide, and 20 grams of calcium carbonate. The Injection/Return Flow procedure was conducted using this fluid and an acidic polyglycol soak solution containing 14% by volume of a 31.5 weight % HCl solution, 44% by volume of a 19.2 lbm/gal (2304 kg/m$^3$) zinc bromide/calcium bromide solution, and 42% by volume of a polyglycol solution containing 93.46% by weight of a polyethyleneglycol of about 8000 molecular weight. The data obtained are set forth in Table 5.

TABLE 5

| Test | 1 |
|---|---|
| Acid Soak Time, hr | 5 |
| Acidic Polyglycol Soak Time, hr | 5 |
| Acidic Polyglycol Soak Solution | |
| Volume % HCl (31.5%) | 14 |
| Volume % PG Solution | 42 |

TABLE 5-continued

| Test | 1 |
|---|---|
| % PG in PG Solution | 93.5 |
| Volume % 2304 kg/m$^3$ ZnBr$_2$/CaBr$_2$ | 44 |
| Permeability, Initial, sec | |
| Injection * | 32.5 |
| Return | 26.5 |
| Permeability, Final, sec | |
| Injection | 33.5 |
| Return | 32 |
| Permeability, % of Initial | |
| Injection | 97 |
| Return | 83 |

*Average of two tests
PG = Polyglycol

What is claimed is:

1. A process for enhancing the removal of adhering solids from the surface of a borehole in a hydrocarbon-containing subterranean formation which comprises contacting the borehole surface with an acidic soak solution containing a water soluble polyglycol having the empirical formula:

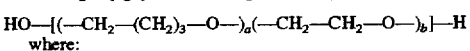

where:

a=0 and b is greater than 0 and less than or equal to 250, and thereafter contacting the surface of the borehole with a wash solution to remove the solids from the borehole.

2. The process of claim 1 wherein the polyglycol is such that b=90–200.

3. A process of enhancing the removal of adhering solids from the surface of a borehole wherein the adhering solids are deposited together with a filter cake from a well drilling, completion, or workover fluid during well servicing operations which comprises contacting the filter cake with an acidic soak solution containing a polyglycol having the empirical formula:

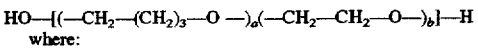

where:

a=0–70, provided that a>0 when b=0
b=0–250, provided that b>0 when a=0 and thereafter contacting the surface of the borehole with a wash solution to remove the solids from the borehole.

4. A process for enhancing the removal of solids from screens or other sand control devices present in a borehole adjacent hydrocarbon-bearing subterranean formations which comprises contacting the screens or other sand control devices with an acidic soak solution containing a polyglycol having the empirical formula:

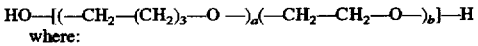

where:

a=0–70, provided that a>0 when b=0
b=0–250, provided that b>0 when a=0.

5. The process of claim 1 or 2, wherein the acidic soak solution contains one or more inorganic water soluble salts dissolved therein in amounts up to saturation to provide the acidic soak solution with the density desired.

6. The process of claim 3 wherein the polyglycol is such that a=0–10, and b=90–200 when a=0.

7. The process of claim 3 wherein the polyglycol is such that a=0, and b=90–200.

8. The process of claim 3 wherein the polyglycol is such that a=5–10.

9. The process of claim 4 wherein the polyglycol is such that a=0–10, and b=90–200 when a=0.

10. The process of claim 4 wherein the polyglycol is such that a=0, and b=90–200.

11. The process of claim 4 wherein the polyglycol is such that a=5–10.

12. The process of claim 3, 6, 7, or 8, wherein the acidic soak solution contains one or more inorganic water soluble salts dissolved therein in amounts up to saturation to provide the acidic soak solution with the density desired.

13. The process of claim 4, 9, 10, or 11, wherein the acidic soak solution contains one or more inorganic water soluble salts dissolved therein in amounts up to saturation to provide the acidic soak solution with the density desired.

* * * * *